(12) United States Patent
Stayman et al.

(10) Patent No.: US 10,013,740 B2
(45) Date of Patent: Jul. 3, 2018

(54) MODEL-BASED TOMOGRAPHIC RECONSTRUCTION WITH CORRELATED MEASUREMENT NOISE

(71) Applicant: THE JOHNS HOPKINS UNIVERSITY, Baltimore, MD (US)

(72) Inventors: Joseph Stayman, Baltimore, MD (US); Jeffrey Siewerdsen, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 14/730,698

(22) Filed: Jun. 4, 2015

(65) Prior Publication Data
US 2015/0356712 A1    Dec. 10, 2015

Related U.S. Application Data

(60) Provisional application No. 62/007,447, filed on Jun. 4, 2014.

(51) Int. Cl.
*G06T 5/00* (2006.01)
*G06T 11/00* (2006.01)

(52) U.S. Cl.
CPC ............ *G06T 5/002* (2013.01); *G06T 11/006* (2013.01); *G06T 2207/10081* (2013.01);
(Continued)

(58) Field of Classification Search
None
See application file for complete search history.

(56) References Cited

U.S. PATENT DOCUMENTS 8,144,829 B2    3/2012   Zhu et al.
2006/0235293 A1*  10/2006   Raupach ................ A61B 6/032
                                                    600/425
(Continued)

FOREIGN PATENT DOCUMENTS

WO       2011-100723 A2    8/2011

OTHER PUBLICATIONS

Azpurua et al., "A Comparison of Spatial Interpolation Methods for Estimation of Average Electromagnetic Field Magnitude", Progress in Electromangetics Research, 2010.*
(Continued)

*Primary Examiner* — Matthew Bella
*Assistant Examiner* — Brian Shin
(74) *Attorney, Agent, or Firm* — Johns Hopkins Technology Ventures (57) ABSTRACT

The present invention is directed to a novel tomographic reconstruction framework that explicitly models the covariance of the measurements in the forward model using a mean measurement model and a noise model. This more accurate model can result in improved image quality, increased spatial resolution, and enhanced detectability—in particular, for imaging scenarios where there are features on the order of the correlation length in the projection data. Applications where these methods might have particular benefit include high resolution CBCT applications as in CBCT mammography (where very fine calcifications are difficult to resolve due to detector blur and correlation), musculoskeletal imaging (where fine bone details are important to the imaging task), or in temporal bone imaging where the fine detail structures of the inner ear are also difficult to resolve with standard imaging techniques.

16 Claims, 5 Drawing Sheets

(52) U.S. Cl.
CPC ............... *G06T 2207/10104* (2013.01); *G06T 2207/10108* (2013.01); *G06T 2211/416* (2013.01); *G06T 2211/424* (2013.01)

(56) References Cited

U.S. PATENT DOCUMENTS

| | | | |
|---|---|---|---|
| 2009/0225932 A1* | 9/2009 | Zhu | A61B 6/032 378/7 |
| 2011/0228906 A1* | 9/2011 | Jaffray | A61B 6/032 378/65 |
| 2012/0019512 A1 | 1/2012 | Yang et al. | |
| 2012/0183108 A1* | 7/2012 | Narayanan | H04B 1/10 375/349 |

OTHER PUBLICATIONS

D. J. Tward, et al., "Cascaded systems analysis of the 3D noise transfer characteristics of flat-panel cone-beam CT," Medical Physics, vol. 35, pp. 5510-5529, Dec. 2008.

B. Whiting, "X-ray CT signal statistics," Medical Physics, vol. 31, pp. 1744-1744, Jun. 2004.

K. Lange, "Convergence of EM image reconstruction algorithms with Gibbs smoothing," IEEE Trans Med Imaging, vol. 9, pp. 439-446, 1990.

C. R. Vogel, et al., "Iterative methods for total variation denoising," Siam Journal on Scientific Computing, vol. 17, pp. 227-238, Jan. 1996.

B. Feng, et al., "Incorporation of system resolution compensation (RC) in the ordered-subset transmission (OSTR) algorithm for transmission imaging in SPECT," IEEE Trans Med Imaging, vol. 25, pp. 941-949, Jul. 2006.

\* cited by examiner

SAMPLE OPTIMIZATION ALGORITHM TO SOLVE EQ. (9)

function apply_image_updates $$\hat{l} = -\log(\mathbf{D}_{b^{-1}} y)$$
$$b = \mathbf{A}^T \texttt{applyKinverse}(\hat{l})$$
$$r_{[0]} = b - \mathbf{A}^T \texttt{applyKinverse}(\mathbf{A}\mu_{[0]})$$
$$p_{[0]} = r_{[0]}$$

for i = 0 to NUM_MU_UPDATES $$g_{[i]} = \mathbf{A}^T \texttt{applyKinverse}(\mathbf{A}p_{[i]})$$
$$\alpha = \frac{r_{[i]}^T r_{[i]}}{p_{[i]}^T g_{[i]}}$$
$$\mu_{[i+1]} = \mu_{[i]} + \alpha p_{[i]}$$
$$r_{[i+1]} = r_{[i]} + \alpha g_{[i]}$$
$$p_{[i+1]} = r_{[i+1]} + \frac{r_{[i+1]}^T r_{[i+1]}}{r_{[i]}^T r_{[i]}} p_{[i]}$$

end function applyKinverse(vector $u$)

$$s_{[0]} = u - \mathbf{K}_l v_{[0]}$$
$$q_{[0]} = s_{[0]}$$

for j = 1 to NUM_KINV_UPDATES $$h_{[j]} = \mathbf{K}_l q_{[j]}$$
$$\beta = \frac{s_{[j]}^T s_{[j]}}{q_{[j]}^T h_{[j]}}$$
$$v_{[j+1]} = v_{[j]} + \beta q_{[j]}$$
$$s_{[j-1]} = s_{[j]} + \beta h_{[j]}$$
$$q_{[j+1]} = s_{[j+1]} + \frac{s_{[j+1]}^T s_{[j-1]}}{s_{[j]}^T s_{[j]}} q_{[j]}$$

end

MODEL-BASED TOMOGRAPHIC RECONSTRUCTION WITH CORRELATED MEASUREMENT NOISE

CROSS REFERENCE TO RELATED APPLICATIONS

This application claims the benefit of U.S. Provisional Patent Application No. 62/007,447 filed Jun. 4, 2014, which is incorporated by reference herein, in its entirety.

GOVERNMENT SUPPORT

This invention was made with government support under NIH 1R21EB014964 and 2RO1CA112163 awarded by the National Institutes of Health. The government has certain rights in the invention.

FIELD OF THE INVENTION

The present invention relates generally to medical imaging. More particularly, the present invention relates to a method for tomographic reconstruction.

BACKGROUND OF THE INVENTION

Tomographic reconstruction is an ill-conditioned estimation problem where noise present in measurement data can be greatly magnified by the image reconstruction process. Thus, accurate reconstruction techniques must carefully balance noise in the reconstruction (which arises from noise in the measurements) with prior information that can be used to mitigate noise (typically using notions of image smoothness—perhaps with edge-preservation). So-called model-based reconstruction approaches achieve this balance using an explicit model for the measurement noise. These approaches, also called statistical reconstruction methods, tend to provide better image quality over nonstatistical methods (e.g., filtered-backprojection (FBP)) that do not leverage a noise model. These approaches can also permit the reduction of radiation dose without loss of imaging performance. As such, the accuracy of the measurement model, including the specific noise model, can influence image quality. Generally, one expects that increasing fidelity of the measurement model will improve image quality and/or dose utilization.

The detection process in tomography varies across modalities (e.g., PET, SPECT, CT, and cone-beam CT (CBCT)) and specific devices and hardware vendors. Moreover, exact mathematical modeling of the detection process can be difficult, and approximations are often made. For example, in CBCT using flat-panel detectors (FPDs), x-ray photons are generated according to a process well-modeled by Poisson noise, but are detected by an indirect process whereby x-ray photons are converted in a phosphor or scintillator to visible light photons (another statistical process in which a randomly distributed number of optical photons are produced for each interacting x-ray), which in turn spread within the scintillator (causing image blur and noise correlation) and are converted to electrical charge in a semiconductor, amplified, and quantized in an analog-to-digital convertor (yet another statistical process in terms of the amount of noise added by the electronics). The resulting model is complex, neither purely Gaussian nor Poisson. The cascade of statistical processes stemming from the initially Poisson-distribute fluence of incident photons includes: Bernoulli selection (interaction of x-ray in the converter); Poisson+Excess (conversion to optical photons); Bernoulli selection (conversion to electrical charge); and Gaussian (electronics noise). Although the resulting statistical process can be difficult to write down in a closed mathematical form, a cascaded systems analysis of signal and noise transfer characteristics in the imaging chain has shown to provide a very accurate model of first-order (mean) and second-order (variance) statistics. One commonly used alternative is to approximate the noise model using an appropriately parameterized Gaussian (or Poisson) model. In many systems, this assumption also leads to a very accurate model.

One assumption on the noise model that appears universal in current model-based reconstruction is that noise is independent across measurements. That is, there are no correlations between measurements. While this may be a reasonable assumption, for example, in CT detectors where blur and cross-talk between detector elements is minimal, this assumption is generally not true and is a very coarse approximation to FPDs. In FPDs, which are a prevalent form of detector in CBCT, such correlations in the signal and noise can be substantial due to the physics of detection. (During the conversion of x-ray photons to visible light photons, many visible photons are generated from a single x-ray, and these visible photon spread spatially in the detector creating a "patch" of correlated signal.)

Accordingly, there is a need in the art for a method of tomographic reconstruction that models the covariance of measurements in the forward model to improve image quality, increase spatial resolution and enhance detectability.

SUMMARY OF THE INVENTION

The foregoing needs are met, to a great extent, by the present invention which provides, a method for tomographic reconstruction including obtaining image data from an imaging modality. The method also includes processing the image data with a mean measurement model and processing the image data with a noise model. Additionally, the method includes reconstructing an image using the mean measurement model and the noise model.

In accordance with another aspect of the present invention, the imaging modality takes the form of at least one of a PET, SPECT, CT, or CBCT imager. The method also includes configuring the mean measurement model to capture deterministic elements of a measurement related to the image data and configuring the noise model to capture stochastic elements. Additionally, the method includes using a fixed computer readable medium for processing the image data with the mean measurement model and noise model and also for reconstructing the image using the mean model and the noise model. Additionally, the noise model can be configured to address correlated and uncorrelated noise. The noise model can be derived using a cascaded system modeling approach. A generalized nonlinear least squares estimation objective function can be used for reconstruction. A penalty function can be applied, and the penalty function can take the form of a roughness penalty, quadratic penalties on differences of neighboring pixels, and total variation penalties. A mean forward model can be used, and the mean forward model can include an addition of correlated noise.

In accordance with another aspect of the present invention, a system for tomographic reconstruction includes an imaging device configured for obtaining image data. The system also includes a non-transitory computer readable medium. The non-transitory computer readable medium is programmed with steps including processing the image data with a mean measurement model, processing the image data with a noise model, and reconstructing an image using the mean measurement model and the noise model.

In accordance with yet another aspect of the present invention, the imaging device takes the form of at least one of a PET, SPECT, CT, or CBCT imager. The mean measurement model is configured to capture deterministic elements of a measurement related to the image data. The noise model is configured to capture stochastic elements. The noise model is configured to address correlated and uncorrelated noise. The noise model is derived using a cascaded system modeling approach. A generalized nonlinear least squares estimation objective function can be used for reconstruction.

BRIEF DESCRIPTION OF THE DRAWING

The accompanying drawings provide visual representations, which will be used to more fully describe the representative embodiments disclosed herein and can be used by those skilled in the art to better understand them and their inherent advantages. In these drawings, like reference numerals identify corresponding elements and.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed to a novel tomographic reconstruction framework that explicitly models the covariance of the measurements in the forward model. This more accurate model can result in improved image quality, increased spatial resolution, and enhanced detectability—in particular, for imaging scenarios where there are features on the order of the correlation length in the projection data. Applications where these methods might have particular benefit include high resolution CBCT applications as in CBCT mammography (where very fine calcifications are difficult to resolve due to detector blur and correlation), musculoskeletal imaging (where fine bone details are important to the imaging task), or in temporal bone imaging where the fine detail structures of the inner ear are also difficult to resolve with standard imaging techniques.

To construct a model-based approach, a mean measurement model is specified that captures deterministic elements of the measurements and a noise model is specified that captures the stochastic elements. Consider the following simplified mean measurement model:

$$\bar{y} = D\{b\}\exp(-A\mu) \quad (1)$$

where $\bar{y}$ denotes a vector comprised of N mean measurements (where each element of the vector is a specific detector measurement at a specific gantry position), $D\{\ \}$ denotes a diagonal matrix operator (placing elements of the vector operand onto the diagonal of a square matrix), the vector b contains measurement-specific gain values (e.g., x-ray intensity, detector sensitivities, etc), A represent the so-called system matrix that, for tomography, performs the projection operation, and $\mu$ denotes a vector of elements comprising the voxelized image volume.

The standard assumption at this point is to presume that the measurements are independent of one another and elements of the (noisy) measurement vector, y, have a known probability distribution. E.g., $$y_i \sim \text{Gaussian}(\bar{y}_i, \sigma_i^2) \text{ or } y_i \sim \text{Poisson}(\bar{y}_i) \quad (2)$$

where the subscript, i, denotes the $i^{th}$ element of a vector, and $\sigma_i^2$ represents the variance of the $i^{th}$ measurement. As mentioned previously, in many systems, including those using FPDs, the presumption of independence is violated. In this case, the joint probability distribution of the measurement vector should be considered. Under a Gaussian noise model assumption, non-independent measurements are distributed:

$$y \sim \text{Gaussian}(\bar{y}, K) \quad (3)$$

where K denotes a N×N covariance matrix for the vector y. (One might also attempt to use a Poisson-like distribution where there are correlations between elements of y. Further, one may model the distribution as Poisson with a so-called Poisson excess.) While (3) is completely general for the Gaussian scenario, the covariance matrix K may be structured. For example, a simple model for x-ray photons that are independent prior to detection, but have correlations introduced due to spatial blur (e.g. light spread) after photon conversion in a scintillator might be $$K = BD\{\sigma_{fluence}^2\}B^T + D\{\sigma_{readout}^2\} = BD_f B^T + D_r \quad (4)$$

where the vector, $\sigma_{fluence}^2$, captures pre-detection quantum noise, vector, $\sigma_{readout}^2$, models independent readout noise, and the matrix B models the blur operation. For compact and/or shift-invariant blurs, the covariance matrix in (4) is highly structured. More sophisticated noise models may be derived using a cascaded system modeling approach, where the covariance is propagated through a sequence of stages representing all the of the detection physics. If only first- and second-order statistics are modeled in such a cascaded model the above Gaussian assumption is applicable and the above methodology fits exactly. However, one could also, within the same basic framework, consider other statistical distributions (e.g., Poisson, shifted-Poisson, etc.) for the measurements (with correlations) resulting in a generalized likelihood-based objective (as opposed the least-squares objective below). Additionally, while not necessary for the following reconstruction development, if K has structure including clustering of nonzero elements about the main diagonal, is circulant, etc., these properties can be leveraged for computational advantage.

Considering the general Gaussian case, a generalized nonlinear least-squares estimation objective function can be written for reconstruction. Specifically, $$\hat{\mu} = \operatorname*{argmin}_{\mu} L(\mu; y) \text{ where} \tag{5}$$

$$L(\mu; y) = \|y - y(\mu)\|^2_{K^{-1}} = (y - y(\mu))^T K^{-1}(y - y(\mu))$$

where $\hat{\mu}$ represents the solution to this implicitly defined reconstructor. This objective contains $K^{-1}$ which suggests the need for an explicit inversion (of a very large N×N matrix). However, there are many algorithms (including gradient descent approaches, nonlinear conjugate gradients, etc.) that require only the replication of the action of $K^{-1}$, and not its explicit inversion. That is, because $$v = K^{-1}u \Leftrightarrow u = Kv \tag{6}$$

the right-hand equation can be iteratively solved for v given specific u using either a stored K (if sparse) or leveraging a functional application of K (e.g., a form like equation (4) where even the blur matrix B is not stored—instead the equivalent linear operation is applied procedurally using on-the-fly computations, fast Fourier transforms, etc.).

Additionally, the estimator in (5) is unregularized. Knowing that the tomography problem is ill-conditioned and benefits greatly from even simple prior knowledge of desirable image properties (like image smoothness and/or edge-preservation), a penalized objective function is used $$\hat{\mu} = \operatorname*{argmin}_{\mu} \Phi(\mu; y) \tag{7}$$

$$\Phi(\mu; y) = L(\mu; y) + R(\mu)$$

where $R(\mu)$ denotes a roughness penalty (or similar function) that provides a trade-off between noise and resolution in the reconstructed image. Numerous penalty functions are available including quadratic penalties on differences of neighboring pixels, total variation penalties, etc.

While (5) and (7) can be solved using iterative approaches as above, one can potentially simplify the solution through a linearization of the forward model in (1). (Depending on the complexity of the forward model, this is not always possible.) Consider the following transformation of the projection data.

$$\hat{l} = -\log(D_{b^{-1}} y) \text{ where } D_{b^{-1}} = D\left\{\left[\frac{1}{b_1}, \frac{1}{b_2}, \ldots, \frac{1}{b_N}\right]\right\} \tag{8}$$

This scaling and log-transformation is commonly applied in FBP and forms a vector of estimates of the line integrals associated with each measurement. One could now seek a solution to the linear estimation problem:

$$\hat{\mu} = \operatorname*{argmin}_{\mu} \|\hat{l}(y) - A\mu\|^2_{K_l^{-1}} \tag{9}$$

$$= \operatorname*{argmin}_{\mu} (\hat{l}(y) - A\mu)^T K_l^{-1}(\hat{l}(y) - A\mu)$$

$$= [A^T K_l^{-1} A]^{-1} A^T K_l^{-1} \hat{l}(y)$$

which even has a closed-form solution. Though cumbersome to compute directly, there are many iterative approaches dedicated to the solution of these linear forms (e.g. conjugate gradients, etc.). Again, as before, (9) may be modified to include regularization. One complication is that the transformation in (8) will also change the covariance structure. However, one can generally find the covariance of the transformed random vector as well. Specifically, for (8), one finds $$K_l \approx \log\left(1 + \frac{D_{b^{-1}} K D_{b^{-1}}}{E[D_{b^{-1}} y]E[D_{b^{-1}} y]^T}\right) = \log\left(1 + \frac{D_{b^{-1}} K D_{b^{-1}}}{D_{b^{-1}} \overline{yy}^T D_{b^{-1}}}\right). \tag{10}$$

Covariance of the line integrals is dependent on the expected values of the scaled/normalized measurements. Thus, to compute (10), one needs an estimate of the mean measurements. Several possible choices include a) a plug-in method substituting y for $\bar{y}$, b) using a denoised version of y, and c) computing an estimate of $\bar{y}$ based on the current estimate of $\bar{y}$ (within an iterative approach) via the forward model in (1).

Figure 1:
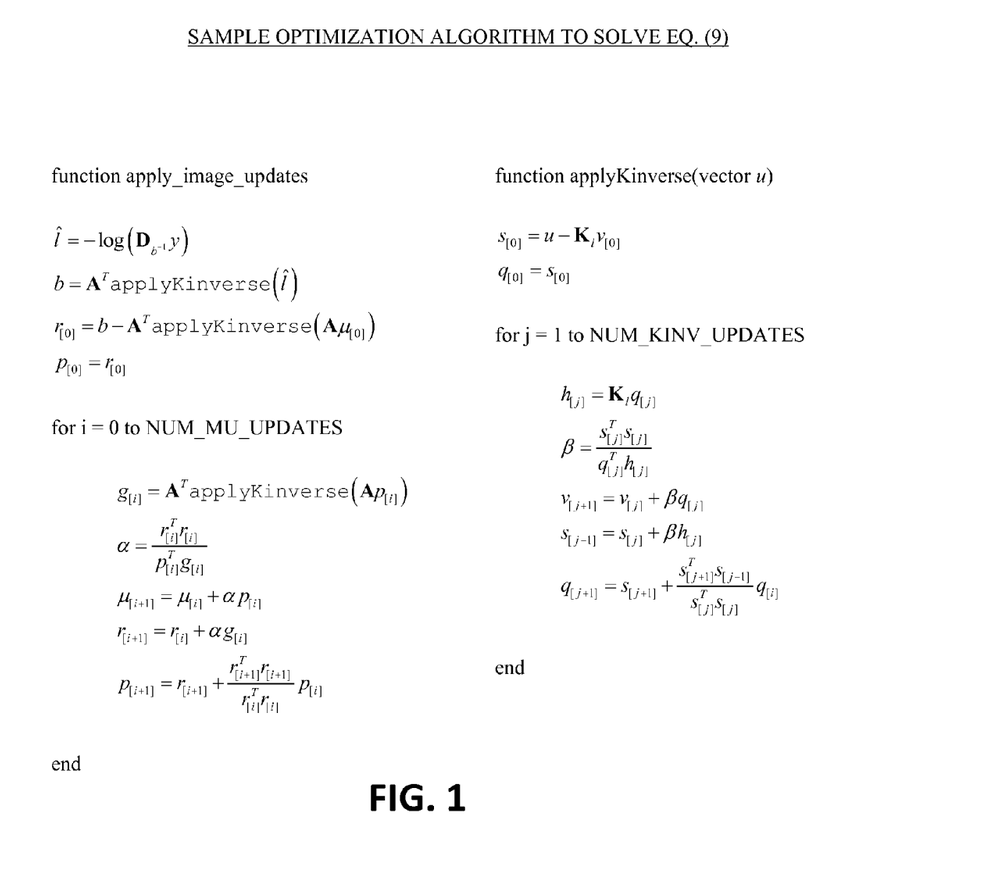
FIG. 1 illustrates sample pseudocode to solve algorithms associated with the present invention.

Sample pseudocode for performing the optimization represented by (9) using conjugate gradients is shown in FIG. 1.

One case of particular interest is the scenario where there is both detector blur in the forward model and correlation in the measurement noise. This situation can be accommodated, for example, using the following forward model and noise model $$\bar{y} = B_1 D\{b\}\exp(-A\mu) K = B_2 D_f B_2^T + D_r. \tag{11}$$

The mean forward model includes the addition of a correlated noise. These models allow for the mean system blur, $B_1$, and the covariance "blur," $B_2$, to be different. (Again, either the mean forward model or the covariance model may be additionally modified to include additional effects like additive scatter, additional noise sources, noise shaping, etc.) While (11) may be solved using the general nonlinear optimization approach as before (the general form in (5) still holds), one might also attempt to linearize the measurements using the transformation $$\hat{l} = -\log(D_{b^{-1}} B_1^{-1} y) \tag{12}$$

One difficulty with (12) is the inversion of the blur operator. While a shift-invariant blur might be inverted using Fourier approaches, another option is to perform the deblurring iteratively in the same fashion K is inverted using (6). The advantage is that this deblurring is performed only once. A similar precomputation must be performed for $K_l$ $$K_l \approx \log\left(1 + \frac{D_{b^{-1}} B_1^{-1} K [B_1^{-1}]^T D_{b^{-1}}}{D_{b^{-1}} B_1^{-1} \overline{yy}^T [B_1^{-1}]^T D_{b^{-1}}}\right) = \tag{13}$$

$$\log\left(1 + \frac{D_{b^{-1}} B_1^{-1} [B_2 D_f B_2^T + D_r][B_1^{-1}]^T D_{b^{-1}}}{D_{b^{-1}} B_1^{-1} \overline{yy}^T [B_1^{-1}]^T D_{b^{-1}}}\right)$$

Figure 2A:
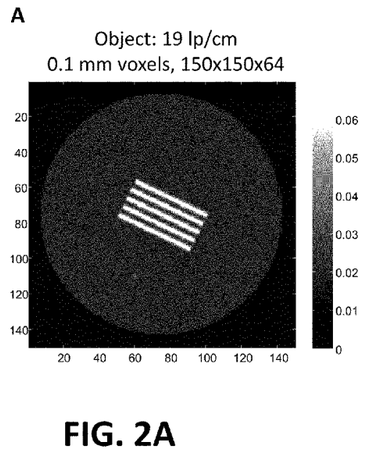
FIGS. 2A-2C illustrate a sample application of correlated noise reconstruction, according to an embodiment of the present invention.
Figure 2B:
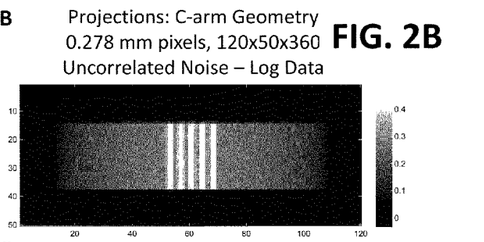
Figure 2C:
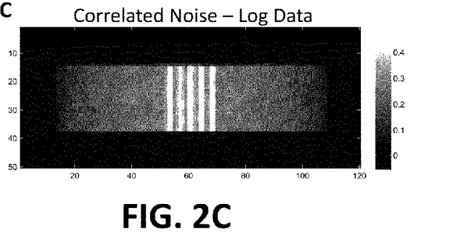

Sample Results:

A sample application of the correlated noise reconstruction is shown below. The sample applications described below are in no way to be considered limiting and are merely included to further illustrate the invention. In this case, a small disc shaped object (FIG. 2A) with a set of high-contrast line pairs and a single small high-density target (simulating high resolution features like calcifications in CBCT mammography) is used. The usual model for projections presumes uncorrelated noise (FIG. 2B); however, flat-panel systems more typically exhibit correlated noise. This simulation experiment considers correlated noise generated by blurring white noise with a Gaussian kernel of 1.88 pixels (FIG. 2C). FIG. 2A is an Illustration of a test phantom with line pairs and a small point target. FIG. 2B is a single projection of the phantom showing uncorrelated noise. FIG. 2C is the same projection but with correlated noise. Correlations have been induced by blurring white noise with a Gaussian kernel with full-width half-maximum equal to 1.88.

Figure 3A:
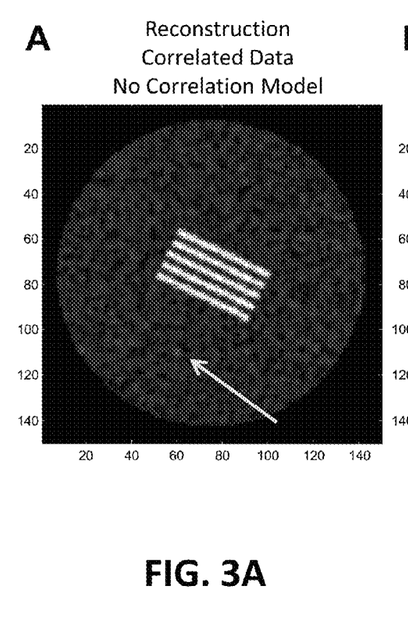
FIGS. 3A and 3B illustrate results of an experiment using a linearized model and sample optimization algorithm, according to an embodiment of the present invention.
Figure 3B:
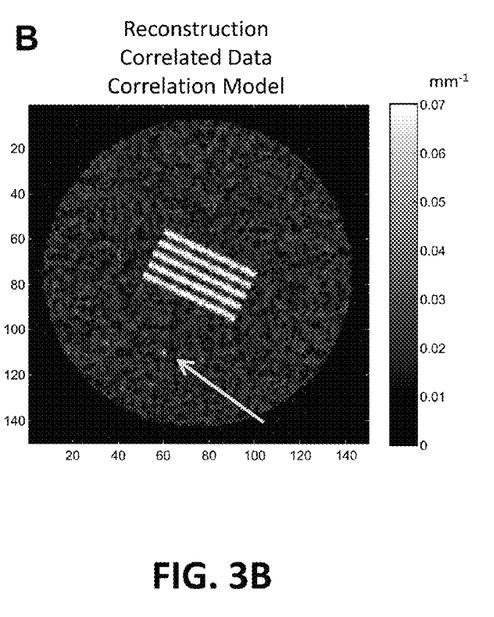

The linearized model of (9) is used and the sample optimization algorithm previously presented to reconstruct the correlated noise projection data. Results of this experiment are shown in FIGS. 3A and 3B. When a conventional uncorrelated noise model is used, as illustrated in FIG. 3A, fine detail structures including the point target are more difficult to resolve than when a correlated noise model that matched the data is used, as illustrated in FIG. 3B. This suggests that using correlated noise models for situations where significant noise correlations exist in data acquisition (e.g., FPD and x-ray image intensifier systems) may be used to overcome current image quality limitations. Reconstructions of correlated-noise projections of the line pair and point target phantom using a conventional uncorrelated noise model, in FIG. 3A and a noise model including the actual data correlations, in FIG. 3B. Note that the point-like structure (marked by yellow arrow), in particular, is more easily discerned in the case where the correlated noise is modeled.

Figure 4A:
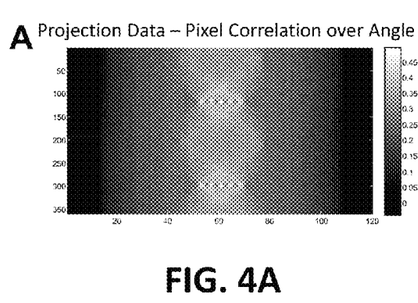
FIGS. 4A and 4B illustrate a second example application of correlated noise modeling in reconstruction, according to an embodiment of the present invention.
Figure 4B:
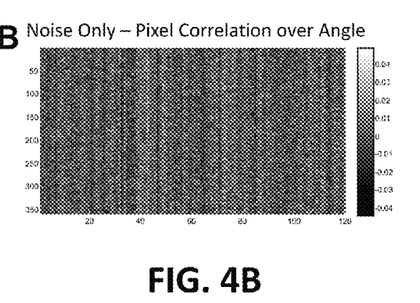

A second example application of correlated noise modeling in reconstruction. FIGS. 4A and 4B illustrate a different kind of correlated noise in the data. Rather than having noise that is spatially correlated across the detector for a single projection angle, this data is correlated across projection angles for individual pixels. Such noise structure exists when there is a pixel bias across all projections (though this may be modeled stochastically). Such a situation can result from a noisy offset (or dark) calibration scan. FIG. 4A illustrates sinogram/projection data of the line-pair and point target phantom with an additive noise component exhibiting correlations across all projection angles for individual pixels. FIG. 4B illustrates additive noise only (without the object). Axes in each case are: Detector Pixel Location (1-120, horizontal axis); and Projection Angle (0-360°, vertical axis).

Figure 5A:
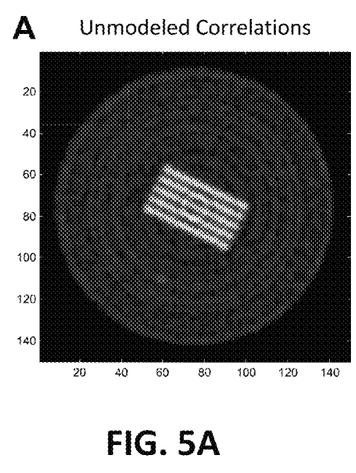
FIGS. 5A and 5B illustrate sample reconstructions of line-pair and point-target phantoms, according to an embodiment of the present invention.
Figure 5B:
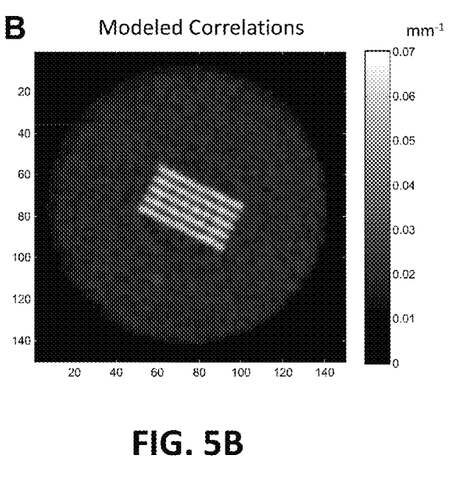

Sample reconstructions of the line-pair and point target phantom are shown in FIGS. 5A and 5B. Note that while significant ring artifacts are present in the case where the noise correlations are unmodeled, the case where the correlations are modeled is largely free of artifacts and has better image quality.

While these two experiments show some of the flexibility of the correlated noise modeling reconstruction technique, the methodology is quite general and can handle other forms of noise correlations including mixed spatial and angular correlations, temporal correlations, etc. Moreover, the methodology applies to general covariance matrices including those with shift-variant properties, heteroscedastic noise across measurements, etc.

The present invention carried out using a computer, non-transitory computer readable medium, or alternately a computing device or non-transitory computer readable medium incorporated into the scanner. Indeed, any suitable method of calculation known to or conceivable by one of skill in the art could be used. It should also be noted that while specific equations are detailed herein, variations on these equations can also be derived, and this application includes any such equation known to or conceivable by one of skill in the art. A non-transitory computer readable medium is understood to mean any article of manufacture that can be read by a computer. Such non-transitory computer readable media includes, but is not limited to, magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape. The computing device can be a special computer designed specifically for this purpose. The computing device can be unique to the present invention and designed specifically to carry out the method of the present invention. Scanners generally have a console which is a proprietary master control center of the scanner designed specifically to carry out the operations of the scanner and receive the imaging data created by the scanner. Typically, this console is made up of a specialized computer, custom keyboard, and multiple monitors. There can be two different types of control consoles, one used by the scanner operator and the other used by the physician. The operator's console controls such variables as the thickness of the image, the amount of tube current/voltage, mechanical movement of the patient table and other radiographic technique factors. The physician's viewing console allows viewing of the images without interfering with the normal scanner operation. This console is capable of rudimentary image analysis. The operating console computer is a non-generic computer specifically designed by the scanner manufacturer for bilateral (input output) communication with the scanner. It is not a standard business or personal computer that can be purchased at a local store. Additionally this console computer carries out communications with the scanner through the execution of proprietary custom built software that is designed and written by the scanner manufacturer for the computer hardware to specifically operate the scanner hardware.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:
1. A method for tomographic reconstruction comprising:
   obtaining image data from an imaging modality;
   determining measurements from the image data;
   processing the image data with a mean measurement model, wherein the mean measurement model captures deterministic elements of the measurements from the image data;

processing the image data with a correlated noise model, wherein the correlated noise model captures stochastic elements of the measurements from the image data, wherein the correlated noise model comprises correlating noise data within the image data into correlated, modeled noise data wherein the noise data is correlated across projection angles for individual pixels;

generating a covariance matrix based on the mean measurement model and the correlated noise model; and, reconstructing an image using the covariance matrix, mean measurement model, and the correlated noise model, wherein the correlated, modeled noise data is included in the reconstructed image.

2. The method of claim 1 further comprising using at least one of a PET, SPECT, CT, or CBCT imager.

3. The method of claim 1 further comprising using a non-transitory computer readable medium for processing the image data with the mean measurement model and correlated noise model.

4. The method of claim 1 further comprising using a non-transitory computer readable medium for reconstructing the image using the mean model and the correlated noise model.

5. The method of claim 1 further comprising configuring the correlated noise model to address correlated and uncorrelated noise.

6. The method of claim 1 further comprising deriving the correlated noise model using a cascaded system modeling approach.

7. The method of claim 1 further comprising reconstructing using a generalized nonlinear least squares estimation objective function.

8. The method of claim 1 applying a penalty function.

9. The method of claim 8 further comprising applying a penalty function comprising one selected from a group consisting of a roughness penalty, quadratic penalties on differences of neighboring pixels, and total variation penalties.

10. The method of claim 1 further comprising using a mean forward model.

11. The method of claim 10 further comprising using the mean forward model including an addition of correlated noise.

12. A system for tomographic reconstruction comprising:
an imaging device configured for obtaining image data;
a non-transitory computer readable medium programmed with steps comprising:
determining measurements from the image data;
processing the image data with a mean measurement model, wherein the mean measurement model captures deterministic elements of the measurements from the image data;
processing the image data with a correlated noise model, wherein the correlated noise model captures stochastic elements of the measurements from the image data, wherein the correlated noise model comprises correlating noise data within the image data into correlated, modeled noise data wherein the noise data is correlated across projection angles for individual pixels;
generating a covariance matrix based on the mean measurement model and the correlated noise model; and,
reconstructing an image using the covariance matrix, mean measurement model, and the correlated noise model wherein the correlated, modeled noise data is included in the reconstructed image.

13. The system of claim 12 wherein the imaging device comprises at least one of a PET, SPECT, CT, or CBCT imager.

14. The system of claim 12 further comprising configuring the correlated noise model to address correlated and uncorrelated noise.

15. The system of claim 12 further comprising deriving the correlated noise model using a cascaded system modeling approach.

16. The system of claim 12 further comprising reconstructing using a generalized nonlinear least squares estimation objective function.

* * * * *